United States Patent
Pai et al.

(10) Patent No.: US 12,530,012 B2
(45) Date of Patent: Jan. 20, 2026

(54) MOLD STATE MONITORING SYSTEM AND METHOD THEREOF

(71) Applicant: Industrial Technology Research Institute, Hsinchu (TW)

(72) Inventors: Yu-Hung Pai, Hsinchu (TW); Hung-Tsai Wu, Hsinchu (TW); He-Chen Liao, Hsinchu (TW); Kai-Jhih Yang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 504 days.

(21) Appl. No.: 18/069,952

(22) Filed: Dec. 21, 2022

(65) Prior Publication Data

US 2024/0210911 A1  Jun. 27, 2024

(51) Int. Cl.
*G05B 19/406* (2006.01)

(52) U.S. Cl.
CPC .. *G05B 19/406* (2013.01); *G05B 2219/45244* (2013.01)

(58) Field of Classification Search
CPC .............. G05B 19/406; G05B 19/4065; G05B 2219/45244
See application file for complete search history.

(56) References Cited

U.S. PATENT DOCUMENTS

| | | | |
|---|---|---|---|
| 5,407,265 A * | 4/1995 | Hamidieh | B23Q 17/0947 73/104 |
| 5,571,539 A | 11/1996 | Starkey | |
| 2018/0314232 A1 * | 11/2018 | Srinivasan | G05B 23/0289 |

(Continued)

FOREIGN PATENT DOCUMENTS

| | | |
|---|---|---|
| CN | 101957889 A | 1/2011 |
| CN | 102103646 A | 6/2011 |
| CN | 103530498 A | 1/2014 |
| CN | 204894446 U | 12/2015 |
| CN | 109918704 A | 6/2019 |

(Continued)

OTHER PUBLICATIONS

Zhang et al., "Bispectral analysis for on-line monitoring of stamping operation", Engineering Applications of Artificial Intelligence, vol. 15, Issue 1, Feb. 2002, pp. 97-104.

(Continued)

*Primary Examiner* — Tameem D Siddiquee
(74) *Attorney, Agent, or Firm* — HSML P.C.

(57) ABSTRACT

A mold state monitoring system is provided, and the monitoring method thereof is: dividing multiple processing signals of a mold into initial state information and wear state information, so as to obtain a target model and a wear threshold based on the initial state information, and input the wear state information into the target model to obtain a wear index of the mold; inputting the latest multiple processing signals and corresponding wear indices thereof into a time series prediction model for training to obtain wear prediction values of hypothetical times, and then performing a predicting operation based on the wear prediction value, so that when the wear prediction value is greater than the wear threshold, it can be estimated as a damage time point of the mold. Therefore, via the design of the time series prediction model, the target information can be changed at any time on the production line, and the state of the mold can be monitored online in real time.

14 Claims, 18 Drawing Sheets

(56) References Cited

U.S. PATENT DOCUMENTS

2020/0394536 A1* 12/2020 Ozeki .................. G06N 5/04
2022/0058527 A1   2/2022 Lavid Ben Lulu et al.
2022/0179393 A1*  6/2022 Zhang ............... G05B 19/4065

FOREIGN PATENT DOCUMENTS

| CN | 112718921 A | 4/2021 |
| CN | 114444231 A | 5/2022 |
| JP | 2014223653  | 12/2014 |
| TW | 202121087 A | 6/2021 |
| TW | I763234 A   | 6/2022 |

OTHER PUBLICATIONS

Wu et al., "Investigating the Evolution of Progressive Die Wear on Uncoated Dp1180 Steel in Production Environment", 36th IDDRG Conference—Materials Modelling and Testing for Sheet Metal Forming, Journal of Physics: Conf. Series 896 (2017).

Zhang et al., "Punching process monitoring using wavelet transform based feature extraction and semi-supervised clustering", ScienceDirect, Procedia Manufacturing, vol. 26, 2018, pp. 1204-1212.

Huang et al., "Stamping Monitoring by Using an Adaptive 1D Convolutional Neural Network", sensors, MDPI, Published Jan. 2, 2021, pp. 1-21.

Dzulfikri et al., "Stamping Tool Conditions Diagnosis: A Deep Metric Learning Approach", applied sciences, MDPI, Published Jul. 28, 2021, pp. 1-16.

Voss et al., "Using stamping punch force variation for the identification of changes in lubrication and wear mechanism", Journal of Physics: Conference Series, vol. 896, 36th IDDRG Conference—Materials Modelling and Testing for Sheet Metal Forming, Jul. 2-6, 2017.

Office Action and Search Report issued in Taiwan Patent Application No. 112101230, dated Aug. 23, 2023.

* cited by examiner

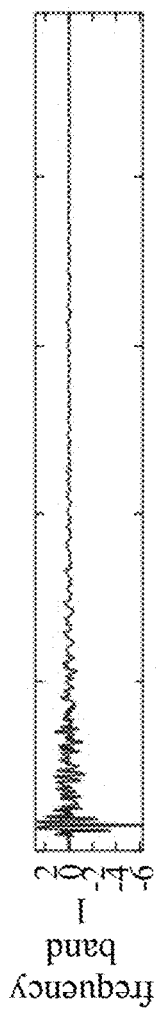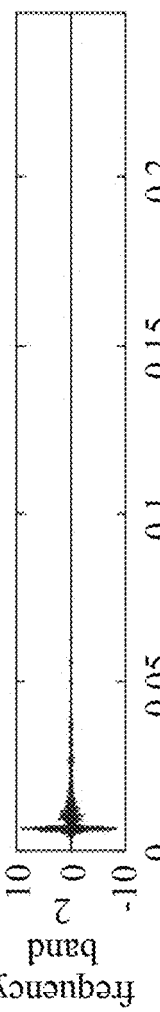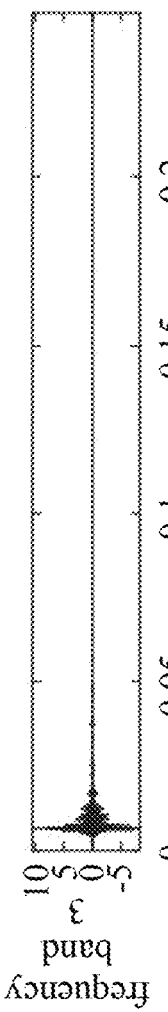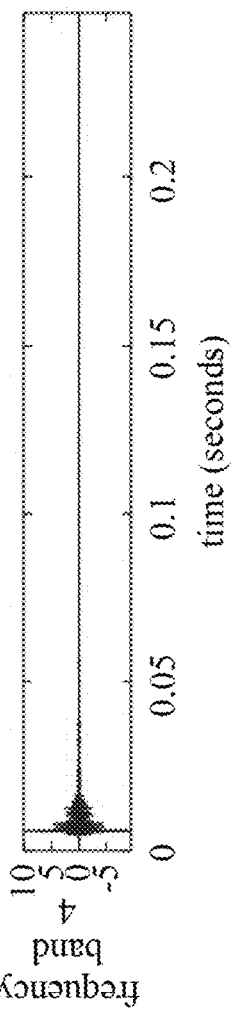
FIG. 5B-1 FIG. 5B-2 FIG. 5B-3 FIG. 5B-4

MOLD STATE MONITORING SYSTEM AND METHOD THEREOF

BACKGROUND

1. Technical Field

The present disclosure relates to a state prediction system and method thereof, and more particularly, to a metal forming mold state monitoring system and method thereof.

2. Description of Related Art

With the rapid development of machine tool automation, it has become the mainstream to use the input of relevant parameters to carry out relevant processing operations. Therefore, computer numeral control (CNC) has been widely used in currently machine tools for processing operations.

Furthermore, with the development of advanced manufacturing technology, higher requirements are put forward for the stability and reliability of metal forming processing. In actual processing, mold damage often affects the efficiency, precision, quality, stability and reliability of metal forming, etc. Therefore, it is very important to select appropriate parameters in the process of metal forming to improve the processing accuracy and quality.

However, on the production line, after a large amount of stamping of the same metal product by the same mold, the mold will be worn out or the tool will have mechanical abnormalities, so that the mold cannot be effectively processed during the actual processing operation, thereby causing poor quality of metal products.

On the other hand, if manual random inspection is adopted, not only the efficiency is not good, but the subsequent defective products are found too late, but also the production efficiency will be delayed, and even the product accuracy will be affected.

Therefore, how to adopt a method that can predict the remain useful life of the mold has become a problem that the industry urgently needs to overcome.

SUMMARY

In view of the above-mentioned problems of the prior art, the present disclosure provides a mold state monitoring method that is applied to a machine tool equipped with a controller and a mold, the mold state monitoring method comprising: providing a plurality of processing signals generated by a plurality processing times of the mold; performing a characteristics acquisition operation to divide the plurality of processing signals into initial state information and wear state information; using the initial state information to obtain a target model and a wear threshold; inputting the wear state information into the target model to obtain a wear index of the mold; inputting at least part of the plurality of processing signals and corresponding wear indices thereof into a time series prediction model for training to obtain wear prediction values of hypothetical times as target information, wherein the order of the hypothetical times is after the last of the plurality of processing times; and performing a predicting operation based on the target information to predict a damage time point of the mold, wherein when the wear prediction value is greater than the wear threshold, it means that the mold is abnormal, and the target information includes dynamic data that is continuously updated according to an increase in the processing times, so that the predicting operation predicts the damage time point of the mold at any time.

The present disclosure further provides a mold state monitoring system that is applied to a machine tool equipped with a controller and a mold, the mold state monitoring system comprising: an acquisition unit which is used to provide a plurality of processing signals; a calculation unit which is communicatively connected to the acquisition unit to receive the plurality of processing signals and perform a characteristics acquisition operation, and divide the plurality of processing signals into initial state information and wear state information, so that the initial state information is used to obtain a target model and generate a wear threshold, and the wear state information is inputted into the target model to obtain a wear index of the mold; and a prediction unit, which is communicatively connected to the calculation unit to receive the wear index, and perform a predicting operation based on the wear threshold to predict a damage time point of the mold, wherein the prediction unit includes a time series prediction model so as to input at least part of the plurality of processing signals and corresponding wear indices thereof into the time series prediction model for training to obtain wear prediction values of hypothetical times as target information; wherein the order of the hypothetical times is after the last of the plurality of processing times; when the wear prediction value is greater than the wear threshold, it means that the mold is abnormal; and the target information includes dynamic data that is continuously updated according to an increase in the processing times, so that the predicting operation predicts the damage time point of the mold at any time.

As can be seen from the above, in the mold state monitoring system and method of the present disclosure, mainly by the design of the time series prediction model is mainly used the target information can be changed at any time on the production line, so that the life state of the mold can be predicted at any time without manual random inspection. Therefore, compared with the prior art, on the production line, the mold operated by the present disclosure can maintain effective processing operations to maintain the processing quality. Further, the present disclosure can remind the user of any abnormality in the mold at any time or remind the user to change the mold, so as to avoid the problem that the defective product is found too late and the product needs to be scrapped, and it can also avoid delaying the production efficiency and even other issues such as affecting the product accuracy.

BRIEF DESCRIPTION OF THE DRAWINGS

FIGS. 5B-1 to 5B-4 are schematic waveform views of processing signals of multiple datasets cut out from the file in FIG. 5A.

DETAILED DESCRIPTIONS

Figure 1:
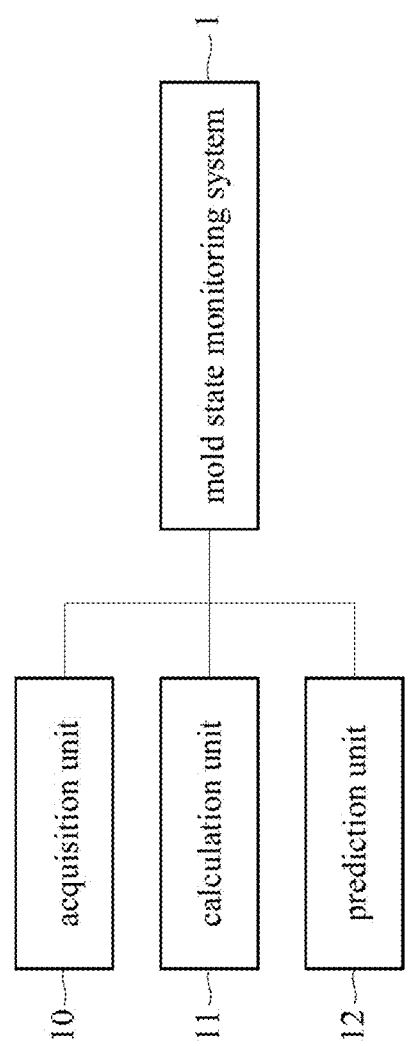
FIG. 1 is a schematic view of a structure configuration of a mold state monitoring system according to the present disclosure.

The following describes the implementation of the present disclosure with examples. Those familiar with the art can easily understand other advantages and effects of the present disclosure from the content disclosed in this specification.

It should be understood that the structures, ratios, sizes, and the like shown in the drawings are used to illustrate the content disclosed in the present disclosure for one skilled in the art to read and understand, rather than to limit the conditions for practicing the present disclosure. Any modification of the structure, alteration of the ratio relationship, or adjustment of the size without affecting the possible effects and achievable proposes should still fall in the range compressed by the technical content disclosed in the present disclosure. Meanwhile, terms such as "upper," "first," "second," "third," "fourth," "one," and the like used herein are merely used for clear explanation rather than limiting practical range by the present disclosure, and thus, the alteration or adjustment of relative relationship thereof without altering the technical content should be considered in the practical scope of the present disclosure.

FIG. 1 is a schematic view of a structure configuration of a mold state monitoring system 1 of the present disclosure. As shown in FIG. 1, the mold state monitoring system 1 includes, for example: an acquisition unit 10 for providing (collecting) a plurality of processing signals, a calculation unit 11 and a prediction unit 12.

In this embodiment, the mold state monitoring system 1 is applied to a computer numerical control (CNC) machine tool, and the machine tool is equipped with a controller, an accelerometer (or other sensors that can sense vibration and sound signals, such as microphones, displacement meters, speedometers, etc.), a programmable controller (PLC) and molds for stamping metal forming, and can be connected to an external data acquisition system (referred to as DAQ or DAS), and the mold state monitoring system 1 is, for example, the standard equipment of the machine tool or an independent computer (such as a remote computer, personal computer, tablet or mobile phone, etc.), which has the functions of calculating and displaying detection results.

The acquisition unit 10 can monitor the vibration signal by installing the accelerometer on the mold, and cooperate with an encoder to set a crankshaft angle range to accurately capture the vibration signal at the moment of stamping.

In this embodiment, the acquisition unit 10 can be used to collect and filter external information (including a plurality of processing parameter signals) to provide a plurality of processing signals; for example, processing information from the controller, PLC state from the machine tool, and sensing data from acquisition devices such as accelerometers, encoders, or DAQ. Further, the collection method of the acquisition unit 10 can be internal direct transmission (for example, the machine tool has the configuration of the mold monitoring system), application programming interface (e.g. to obtain internal information of the machine tool's numerical controller), programmable logic controller (PLC) for internal and external signal transmission and temporary storage of the controller, direct transmission of external devices (for example, encoders transmit coordinate signals, optical rulers transmit coordinate signals, data acquisition cards transmit coordinates and control commands), etc.

Furthermore, the acquisition unit 10 can perform signal judgment operations to obtain the required processing signals. For example, the acquisition unit 10 can be connected with a controller to synchronously acquire processing parameter signals, and then judge vibration data, so that the signal of machine tool idling state or other processing state signals can be automatically filtered.

Figure 2A:
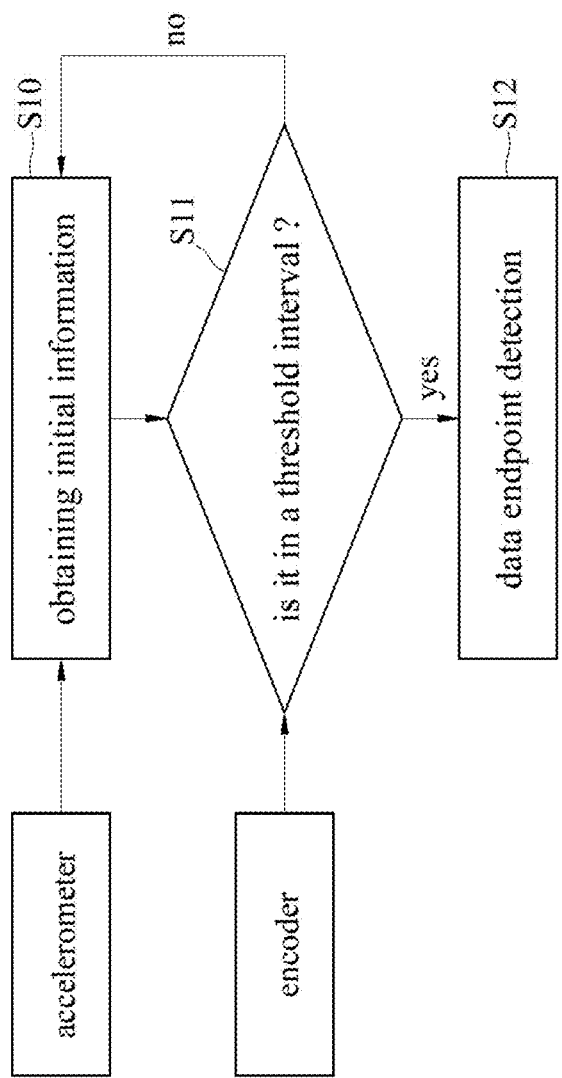
FIG. 2A is a flow chart of an acquisition operation performed by an acquisition unit in FIG. 1.

Moreover, the acquisition operation of the acquisition unit 10 is shown in FIG. 2A.

In step S10, initial information is obtained, which includes the use of an accelerometer (which can monitor the vibration signal of stamping mold) to obtain the values of the initial processing signals related to vibration, the value of the plurality of processing parameter signals obtained by the controller, or the values of other devices and processing operation-related signals. For example, the acquisition unit 10 can directly obtain processing parameter signals such as stamping speed, stamping force, and crankshaft angle from the controller.

In step S11, a plurality of processing initial signals are screened to select part of the processing initial signals for subsequent analysis. For example, based on the threshold intervals (such as between the upper limit and the lower limit) established by the processing parameter signals (such as stamping speed, stamping force, and crankshaft angle) obtained by the controller, it is judged whether the value of the processing parameter signal corresponding to each processing initial signal is in the threshold interval, so as to select the processing initial signal related to vibration corresponding to the value of the processing parameter signal that is greater than the lower limit and less than the upper limit. If the value of the processing parameter signal of the processing initial signal is less than the lower limit or greater than the upper limit, the corresponding vibration-related processing initial signal will not be selected as the subsequent analysis object.

In this embodiment, the crankshaft angle of the stamping action is captured by the encoder for signal endpoint detection to judge a momentary signal from the contact between a punch and a mold to the departure of the punch and the mold, and then filter idling and other noises. Therefore, the encoder can set the upper limit and lower limit of the crankshaft angle of the stamping action. If the processing signal exceeds the threshold interval, the acquisition unit 10 will not acquire it.

Figure 2B:
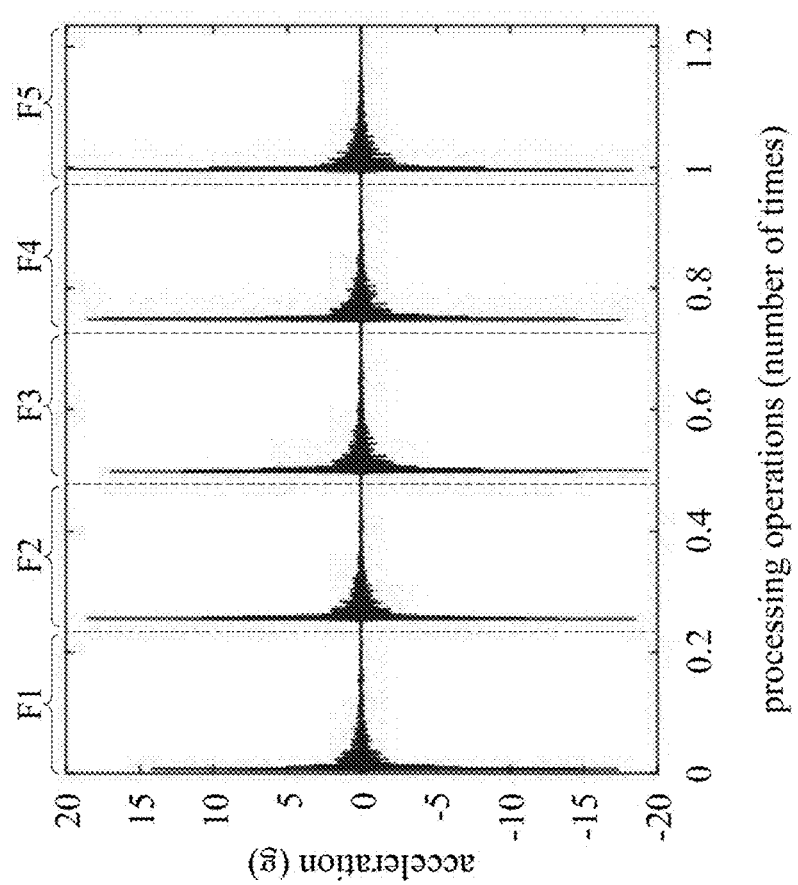
FIG. 2B is a schematic waveform view of a processing signal of one of the files in the initial information in FIG. 2A.

In step S12, the data endpoint detection is carried out to select the processing initial signal corresponding to the value of the controller processing parameter signal in the threshold interval as the processing signal required for analysis, and after data endpoint detection, the vibration-related processing signals collected continuously for a period of time can be divided into data intervals such as five processing signals F1, F2, F3, F4, and F5, as shown in FIG. 2B. For example, in one embodiment, the acquisition part 10 can perform the screening of step S12 to automatically determine the start point and end point of the tool's actual processing time so as to acquire the processing signals F1, F2, F3, F4, F5 for follow-up analysis.

Therefore, the acquisition unit 10 may include accelerometers, encoders or other sensors capable of sensing vibration signals installed on the mold, and filter the information of the idling state and its processing process to accurately acquire the vibration signal in the processing operation.

The calculation unit 11 is communicatively connected to the acquisition unit 10 to receive the plurality of processing signals and perform characteristic acquisition operations. The plurality of processing signals are divided into initial (or new mold) state information and wear state information, so that the initial state information is used to train a target model and generate a wear threshold, and the wear state information is inputted into the target model to obtain a wear index of the mold. Therefore, the processing signals provided by the acquisition unit 10 are characteristic signals of mold wear.

In this embodiment, the plurality of processing signals is defined as first period processing signals and second period processing signals, wherein the first period processing signals are characterized to form the initial state information, and the second period processing signals use the same characterization operation to generate the wear state information inputted into the target model to calculate a loss function as the wear index of the mold.

The method used in the characterization operation is to use a frequency band decomposition method (such as wavelet packet decomposition, empirical mode decomposition or other methods) for each unit processing signal to decompose the original time domain signal into time domain signals of different frequency bands, and monitor the statistical parameters (such as root mean square (RMS) value, allowance/margin, kurtosis shape factor, kurtosis factor, impulse factor, maximum, minimum and variance or other appropriate parameters) of each frequency band.

For example, after the first period processing signals are decomposed and analyzed by the frequency band decomposition method, the characteristics related to the wear of the mold are identified and defined as the first wear characteristics to be integrated into the initial state information, and the second period processing signals are decomposed by the frequency band decomposition method and the second wear characteristics related to the mold wear are extracted to be integrated into the wear state information, wherein the attribute of the second wear characteristics is the same as the attribute of the first wear characteristics.

In one embodiment, the wavelet packet decomposition is used as the frequency band decomposition method of the processing signal. The formula of the wavelet packet decomposition is based on the orthogonal wavelet function, and it is known that $$\varphi_{j+1,k}(x) = 2^{j+\frac{1}{2}} \varphi(2^{j+1}x - k)$$

$k \in Z$ is a set of orthogonal basis of $V_{j+1}$ space, and it is necessary to construct a set of functions $$\psi_{j,k}(x) = 2^{\frac{j}{2}} \psi(2^j x - k),$$

$k \in Z$, so that the spanned space $W_j$ is the orthogonal complement space of $V_j$ in $V_{j+1}$, and the establishment process is as follows:

$$\varphi(x) = \sqrt{2} \sum h_k \varphi(2x - k)$$

wherein $$h_k = \sqrt{2} \int_{-\infty}^{+\infty} \varphi(x) \underline{\varphi(2x - k)} dx$$

and the wavelet equation:

$$\Psi(x) = \sqrt{2} \sum g_k \varphi(2x - k)$$

wherein $g_k = (-1)^k \underline{h}_{1-k}$.

Then, the wavelet packet decomposition decomposes the $W_j$ space, and the subspace $V_j$ and the wavelet subspace $W_j$ are represented by a $$U_j^n,$$

and the following space decomposition can be obtained:

$$U_{j+1}^n = U_j^{2n} \oplus U_j^{2n+1}, \ j \in Z; n \in Z_+$$

wherein $\{\mu_{n,j}(x-k)\}_{k \in Z}$ is the orthonormal basis of space $$U_j^n,$$

so the wavelet packet decomposition algorithm is:

$$\mu_{2n}(x) = \sum h_k \mu_n(2x - k)$$
$$\mu_{2n+1}(x) = \sum g_k \mu_n(2x - k)$$

Figure 2C:
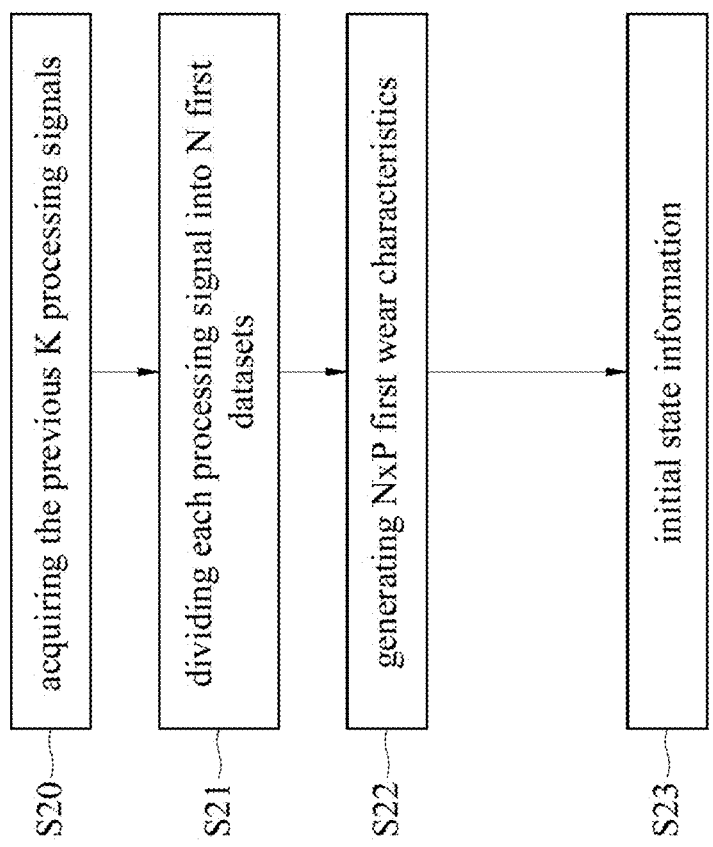
FIG. 2C is a schematic flow chart of one operation of a calculation unit in FIG. 1.

The acquisition process of the initial state information is shown in FIG. 2C. In step S20, the calculation unit 11 receives the previous K processing signals. In step S21, 1s each processing signal is divided into N first datasets according to different frequency bands. In step S22, the statistical characteristics (such as wavelet coefficient, RMS value, allowance/margin, kurtosis, etc., a total of P) of the N first datasets are calculated to generate N×P first wear characteristics. In step S23, the N×P first wear characteristics of the K processing signals are integrated into the initial state information.

Figure 2D:
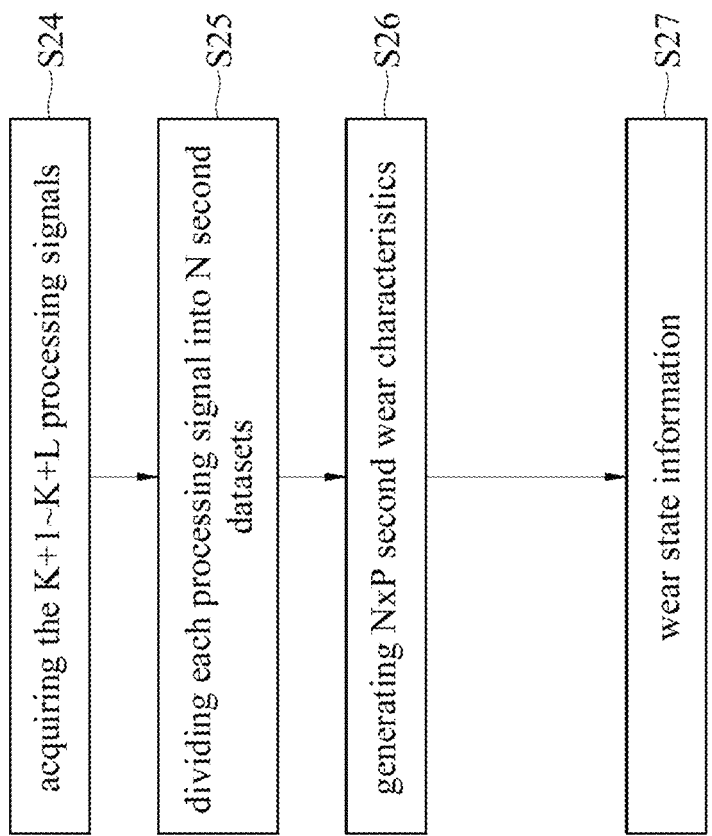
FIG. 2D is a schematic flow chart of another operation of the calculation unit in FIG. 1.

The acquisition process of the wear state information is shown in FIG. 2D. In step S24, the K+1 to K+L processing signals are received. In step S25, the K+1 to K+L processing signals are all divided into N second datasets according to different frequency bands. In step S26, the statistical characteristics (such as wavelet coefficient, RMS value, allowance/margin, kurtosis, etc., a total of P) of the N second datasets are calculated to generate N×P second wear characteristics. In step S27, the second wear characteristics in the K+1 to K+L processing signals are integrated into the wear state information.

In addition, the calculation unit 11 can use the initial state information to train an auto-encoder neural network to generate the target model. For example, the target model is a self-supervised learning model, which uses the built-in module in the Python TensorFlow kit to perform calculations to calculate the wear state of the mold.

The architecture of the auto-encoder is divided into two parts: an encoder and a decoder. First, the "input data" is inputted into the encoder and then compressed into a "low-dimensional" code by the neural network in the encoder architecture, and then the code is passed into the decoder to decode the final "output data." Therefore, the auto-encoder will iteratively learn how to make the input and output close by controlling the loss function, such as MSE, MAE, etc., so that the "input data" and "output data" are as close as possible.

The self-supervised learning model is first to enable the auto-encoder to learn a certain standard state value, and it is expected that when the standard state value is subsequently inputted, the closer the comparison state value generated by the auto-encoder is to the standard state value, the better. In other words, if the comparison state value that is very different from the standard state value is inputted into the trained target model, the error calculated by the target model will increase abnormally.

Figure 2E:
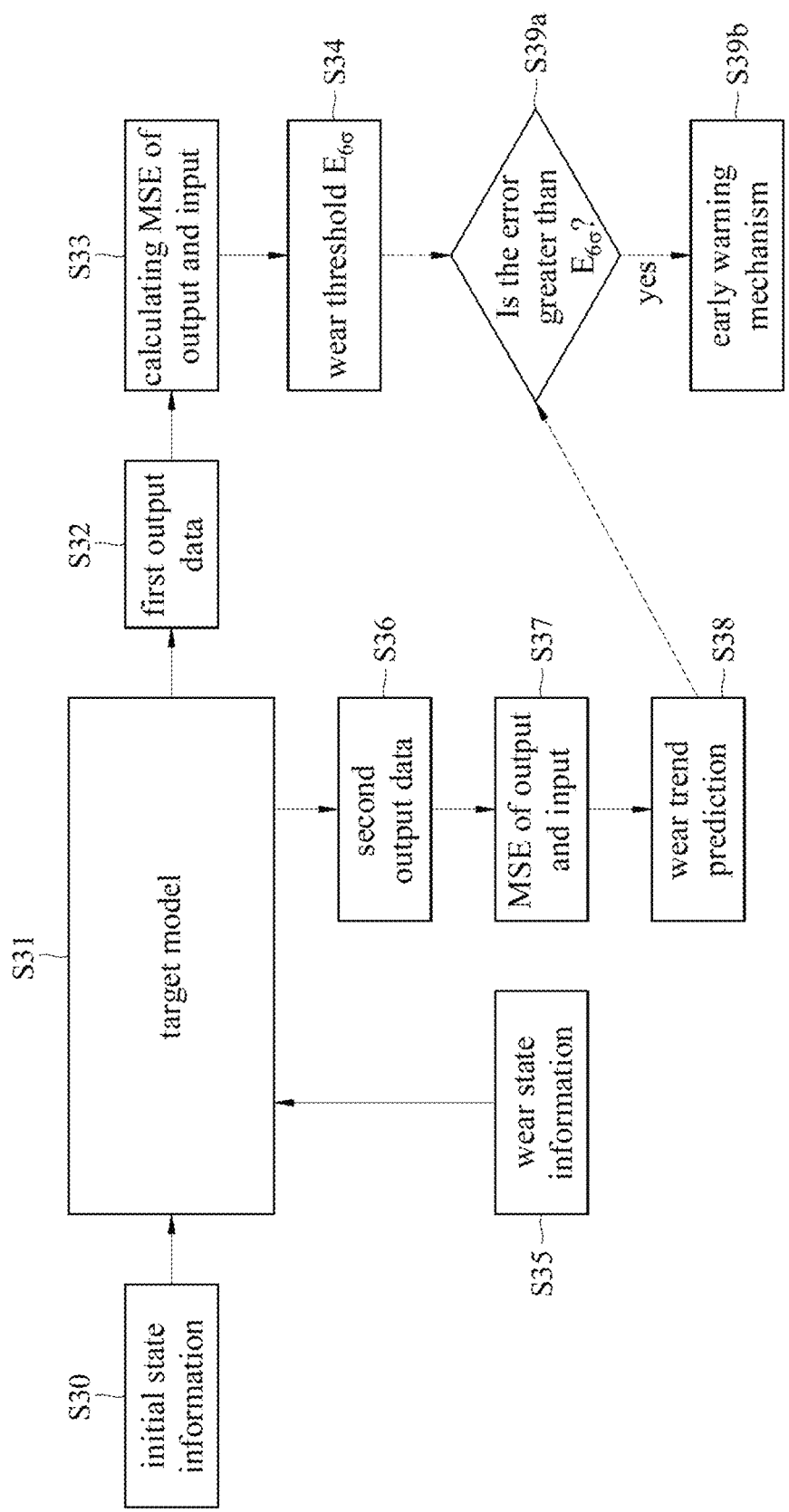
FIG. 2E is a schematic flow chart of the operation and the subsequent applications of the calculation unit in FIG. 1 in conjunction with a target model.

Therefore, the operation flow of the calculation unit 11 can be shown in FIG. 2E. In step S30 to step S32, the initial state information (characteristic matrix as described later) formed by the first period processing signals (such as the 1st to 5000th processing signal) for training is inputted into a target model, and then a first output data (such as another characteristic matrix corresponding to the characteristic matrix) is generated to complete the training of the target model.

In step S33 to step S34, the mean square error (MSE) between the input data (initial state information) and the first output data is calculated as an index unit, and an initial wear index is generated by using a reference error between the input data and the output data, so 5000 initial wear indices can be obtained.

The MSE is obtained by first obtaining the square of the error between "input data" and "output data" and then averaged as follows:

$$\frac{1}{n}\sum_{i=1}^{n}(y_i - y_i^p)^2$$

wherein y is "input data", $y^p$ is "output data", and n is a positive integer.

Figure 2F:
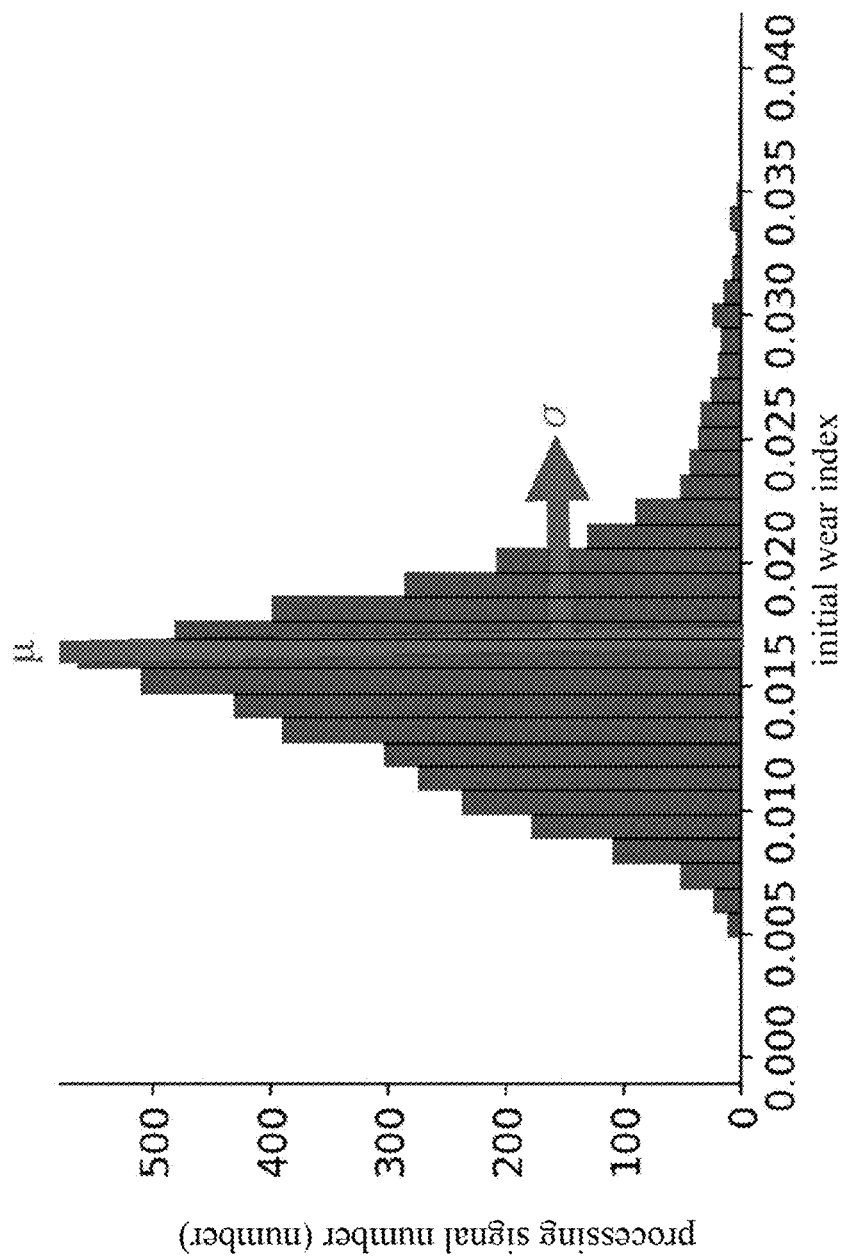
FIG. 2F is a histogram of a calculation process of a wear threshold of the calculation unit in FIG. 1.

Furthermore, the wear threshold E6σ is converted using n initial wear index distributions to obtain the average value μ (as shown in FIG. 2F), then plus six times the standard deviation σ for judging the stamping state. It should be understood that the average value is usually taken between plus and minus three standard deviations. However, since the distribution has no negative numbers, a maximum of six standard deviations can be taken as the quality control threshold. Therefore, the wear threshold E6σ can be adjusted by the multiple of the standard deviation according to the degree of tightness. In this embodiment, 5000 initial wear index distributions can be used for conversion to obtain the average value p, but not limited to 5000.

In step S35 to step S36, the wear state information is inputted into the target model, and then a second output data is generated.

Figure 3:
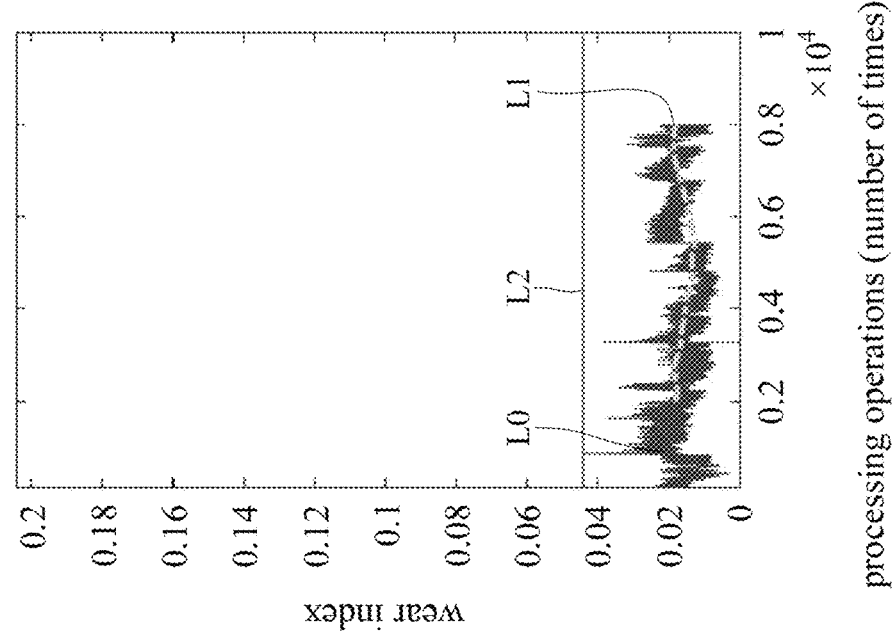
FIG. 3 is a schematic view of a pre-operation of a prediction unit in FIG. 1 using LSTM (time series prediction model, Long-Short Term Memory).

In step S37, the MSE between the input data (wear state information) and the second output data is calculated to obtain the wear index of the mold, as shown in FIG. 3.

Therefore, the auto-encoder neural network can learn the initial state of the mold during the training stage to complete the target model, and in the subsequent monitoring stage, the target model will restore the wear state information to the initial state information as much as possible. Therefore, when the wear index of the mold is getting bigger and bigger, it means that the wear of the mold is getting worse.

The prediction unit 12 is communicatively connected to the calculation unit 11 to receive the wear index (step S38 shown in FIG. 2E), and performs a predicting operation according to the wear threshold (step S39a shown in FIG. 2E), so as to predict a damage time point of the mold, wherein the prediction unit 12 includes a time series prediction model (Long-Short Term Memory, LSTM), so as to input part of the plurality of processing signals and their corresponding wear indexes into the time series prediction model for training to obtain wear prediction values of hypothetical times (step S38 shown in FIG. 2E), which is used as target information.

In this embodiment, the order of the hypothetical times (the 7001st time) is after the last (7000th time) of the plurality of processing times. For example, the time series prediction model (LSTM) of the prediction unit 12 uses the built-in module in the Python TensorFlow kit to perform calculations to perform prediction operations on the latest wear state information (such as the wear index of the 5001th to 7000th processing signal) to generate the wear prediction value. For example, the target information includes dynamic data that is continuously updated according to the increase in the number of processing times, that is, when the number of new processing times is increased (such as adding 100 processing signals), the wear prediction value of future processing is predicted (such as the hypothetical number of 200 times in the future).

Furthermore, the LSTM of the prediction unit 12 mainly defines three stages, namely, a forgetting stage, a selective memory stage and an output stage.

The forgetting stage is to selectively forget the input passed from the previous node. Simply put, it means "forgetting the unimportant and remembering the important". Specifically, $Z^f$ (f stands for forget) obtained by calculation is used as a forget gate to control the events that $C^{(t-1)}$ in the previous state need to keep and forget.

The selective memory stage is to selectively memorize the input of this stage. The main thing is to select and remember the input $X^t$, that is, the important parts are recorded emphatically, and the unimportant parts are less memorized. The current input content is represented by Z obtained from the previous calculation, and the selected gating signal is controlled by $Z^i$ (i stands for information). Therefore, the results obtained in the above two steps are added to get the $C^t$ transmitted to the next state.

The output stage is used to determine which can be used as the output of the current state. It is controlled by $Z^o$, and also scales the $C^o$ obtained in the previous stage (changes through a tan (activation function h)).

Therefore, LSTM is similar to a general recurrent neural network (RNN), and the output $y^t$ is often finally obtained by changing $h^t$.

Also, the target information includes a graph formed by the wear index and the wear prediction value, so that the predicting operation can predict the damage time point of the mold by judging a trend of the wear prediction value in the graph. The predicting operation of the prediction unit 12 is to smooth the curve generated by the wear index first, as shown in FIG. 3, and then the LSTM is used to predict the future trend of the wear of the mold. If the wear prediction value representing the future stamping action will exceed the wear threshold, a warning signal for mold change will be issued, wherein, in FIG. 3, the initial curve L0 formed by the wear index is smoothed to obtain a reference curve L1, and the wear threshold is represented by a horizontal straight line L2.

In addition, when the wear prediction value is greater than the wear threshold, it means that the mold is abnormal, so the result of the predicting operation can start an early warning mechanism (step 39b as shown in FIG. 2E) so as to issue warnings (such as flashing lights, ringing alarm bells, sending electronic messages or other appropriate methods, etc.) before the mold is abnormal or before the mold is replaced. For example, when the prediction trend curve formed by the wear prediction value of the prediction unit 12 exceeds the horizontal line L2 of the wear threshold, the mold state monitoring system 1 will issue a mold change warning to indicate that the life of the existing mold is close to the limit time point.

Figure 4:
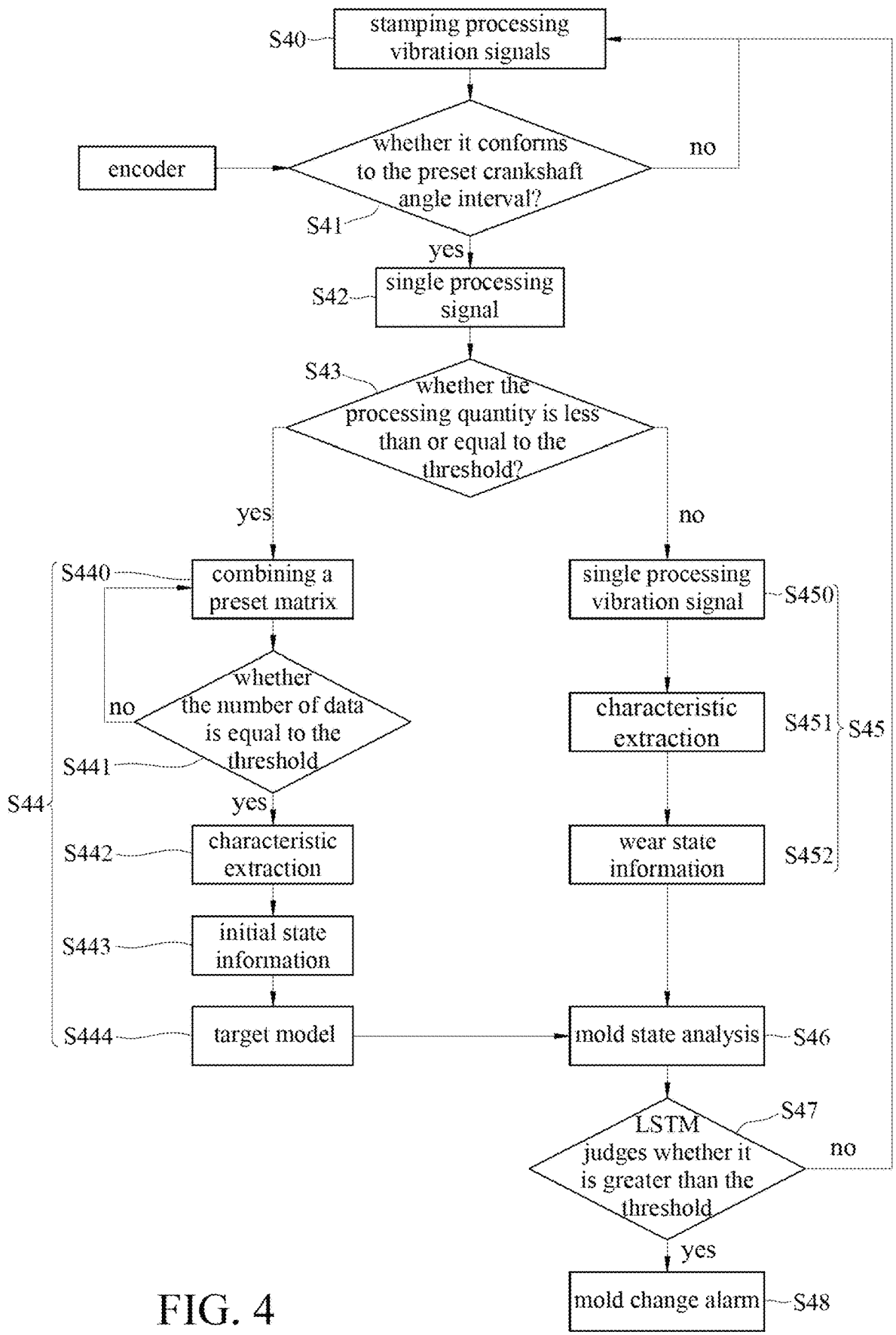
FIG. 4 is a schematic flow chart of a mold state monitoring method according to the present disclosure.

FIG. 4 is a schematic flow chart of the mold state monitoring method of the present disclosure. In this embodiment, the mold state monitoring system 1 is used to implement the mold state monitoring method.

As shown in FIG. 4, first, in step S40, the stamping processing of the machine tool generates a plurality of processing signals such as vibration signals, so that the accelerometer of the acquisition unit 10 collects the processing signals. In this embodiment, the machine tool provides hundreds or tens of thousands of processing signals in a single processing operation.

Next, in step S41, the acquisition unit 10 acquires the crankshaft angle through the encoder, and then receives the processing parameters via the controller to perform the data endpoint detection operation of the processing signal, and judges that the processing signal of the actual processing conforms to the range of the crankshaft angle so as to filter the idling state or other process signals.

Subsequently, in step S42, if the data endpoint detection operation is passed, the acquisition unit 10 numbers the hundreds or tens of thousands of processing signals according to the time sequence, such as 1 to 5000.

Next, in step S43, the acquisition unit 10 judges whether the number of the processing signals (the corresponding number of processing operations) reaches a threshold value, for example, the threshold value is 5000.

Then, in step S44, if the number of these processing signals is less than or equal to the threshold value, then the calculation unit 11 generates initial state information through these processing signals, that is, the 1st to 5000th processing signals can be regarded as the first period processing signals.

For example, in step S440, a preset matrix is first combined for subsequent training of the target model. Assuming that the threshold value in step S43 is 5000, each processing signal is a first dataset including N×P values, so an empty matrix of 5000*(N×P) is first set in step S440. After that, in step S441, it is judged whether the number of these processing signals (for example, 5000 records) is equal to the threshold value, that is, it is detected whether the empty matrix is filled with 5000 data records. It should be understood that the threshold is not particularly limited, as long as it can be used for subsequent training of the target model.

Figure 5A:
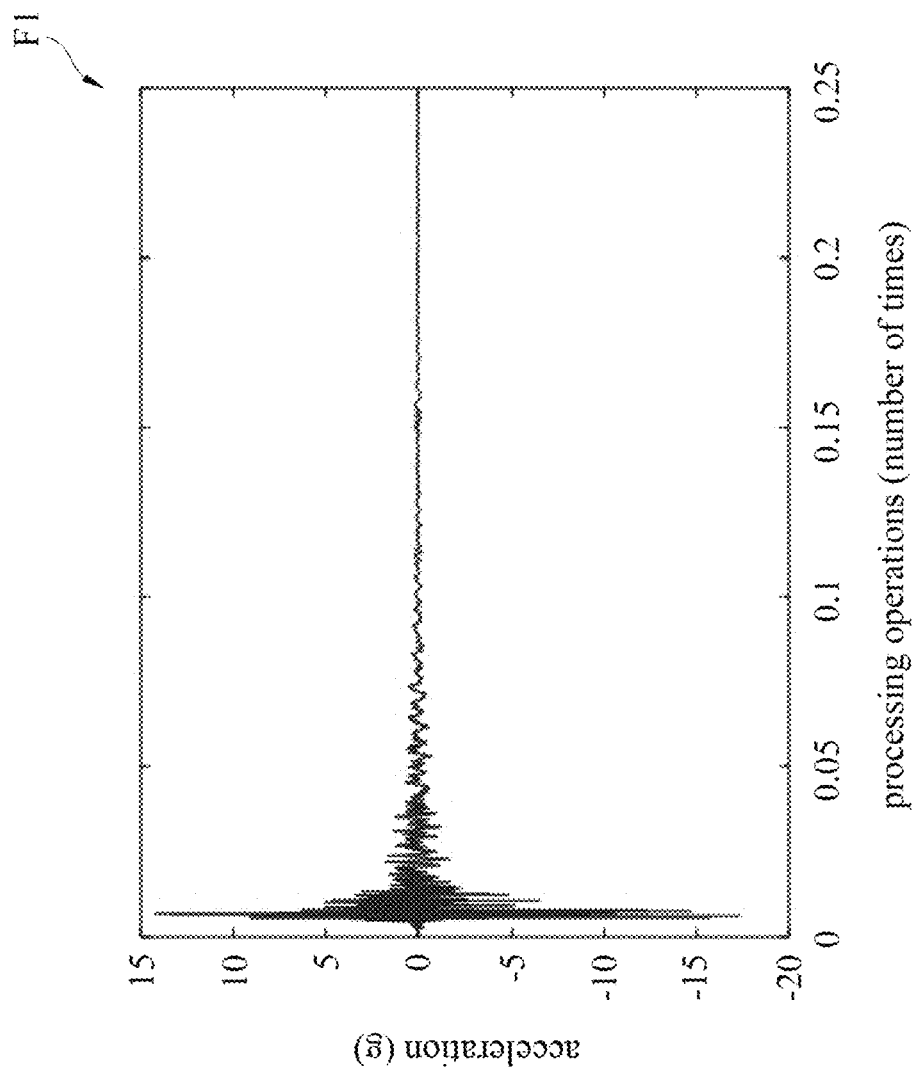
FIG. 5A is a schematic waveform view of a processing signal of one of the files in the initial information in FIG. 2A.

Subsequently, in step S442, one of the 5000 processing signals is shown in FIG. 5A, its sampling frequency is 10240 hertz (Hz), and its effective bandwidth is 5120 Hz so as to use the frequency band decomposition method such as wavelet packet decomposition to divide the processing signal F1 shown in FIG. 5A into N datasets (four as shown in FIG. 5B-1-FIG. 5B-4) according to different frequency bands, which are respectively the time domain signal of the first frequency band 0-1280 Hz (as shown in FIG. 5B-1), the time domain signal of the second frequency band 1281-2560 Hz (as shown in FIG. 5B-2), the time domain signal of the third frequency band 2561-3840 Hz (as shown in FIG. 5B-3), the time domain signal of the fourth frequency band 3841-5120 Hz (as shown in FIG. 5B-4), and calculate the statistical parameters (such as wavelet coefficient, RMS value, margin/allowance, kurtosis shape factor, kurtosis factor, impulse factor or other characteristics, etc., a total of P characteristics) of the N (such as four) datasets.

For example, the wavelet coefficient (WC), root mean square (RMS), kurtosis (Kurtosis) and margin (Allowance) of the first dataset extracted from the first to the fourth frequency band are calculated to generate the statistical parameters of the 4 characteristics shown in the following table.

|  | First frequency band | Second frequency band | Third frequency band | Fourth frequency band |
|---|---|---|---|---|
| RMS | R1 | R2 | R3 | R4 |
| kurtosis | K1 | K2 | K3 | K4 |
| allowance | A1 | A2 | A3 | A4 |
| WC | W1 | W2 | W3 | W4 |

In this table, these statistical parameters are waveform diagrams, and R1~R4, K1~K4, A1~A4, and W1~W4 in the above table are only used as codes to facilitate subsequent explanations. Therefore, the first dataset in this embodiment has 4×4 (16) values.

Moreover, when the machine tool performs multiple (such as 20,000) processing operations, steps S40 to S442 can be repeated to obtain the statistical parameters of multiple sets (such as 20,000 sets) of datasets of the first to fourth frequency bands.

Figure 5C:
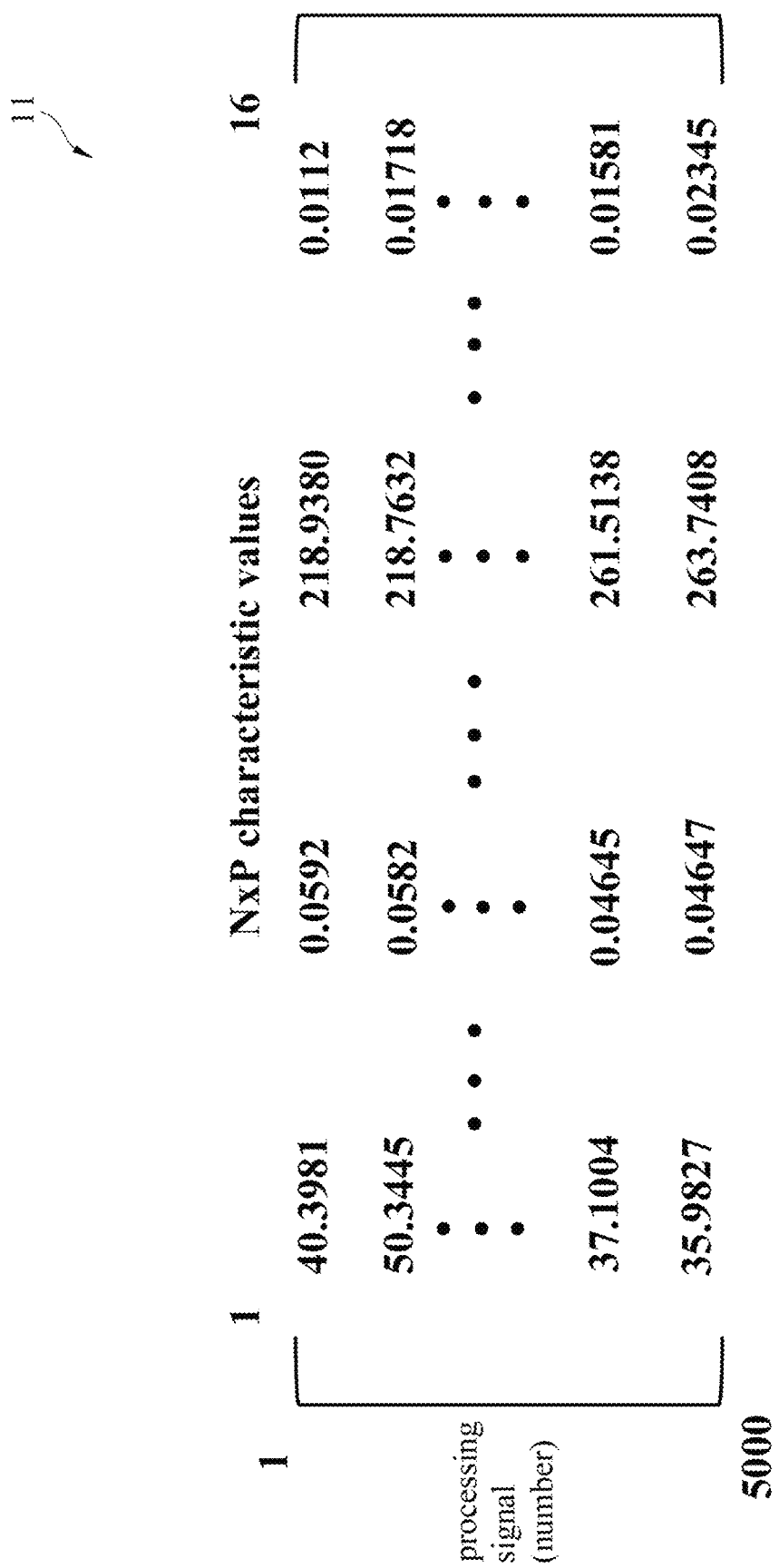
FIG. 5C is a schematic view of a matrix of initial state information in FIG. 4.

Next, in step S443, after the signal of 5000 stampings is obtained through steps S40~step S442, a matrix of 5000*16 is generated as the initial state information, as shown in FIG. 5C, wherein the vertical direction is the number of processing, and the horizontal direction is the signal characteristics. Each row is the signal characteristics generated by a single stamping processing signal, that is, four frequency bands have four statistical parameters such as wavelet coefficient (WC), root mean square (RMS), kurtosis (Kurtosis) and margin (Allowance).

Afterwards, in step S444, the auto-encoder neural network is trained with the initial state information to obtain the target model such as the self-supervised learning model and the wear threshold.

On the other hand, in step S45 (which is similar to step S44), if the number of the processing signal (the corresponding number to the processing operation) is greater than the threshold value, then the calculation unit 11 characterizes the processing signals exceeding the threshold to generate the wear state information.

In this embodiment, the M+Yth single processing signal is characterized to form a wear state information, wherein M is the threshold value, and Y is a positive integer ≥1, that is, a single processing signal starting from the 5001st stamping.

Figure 5D:
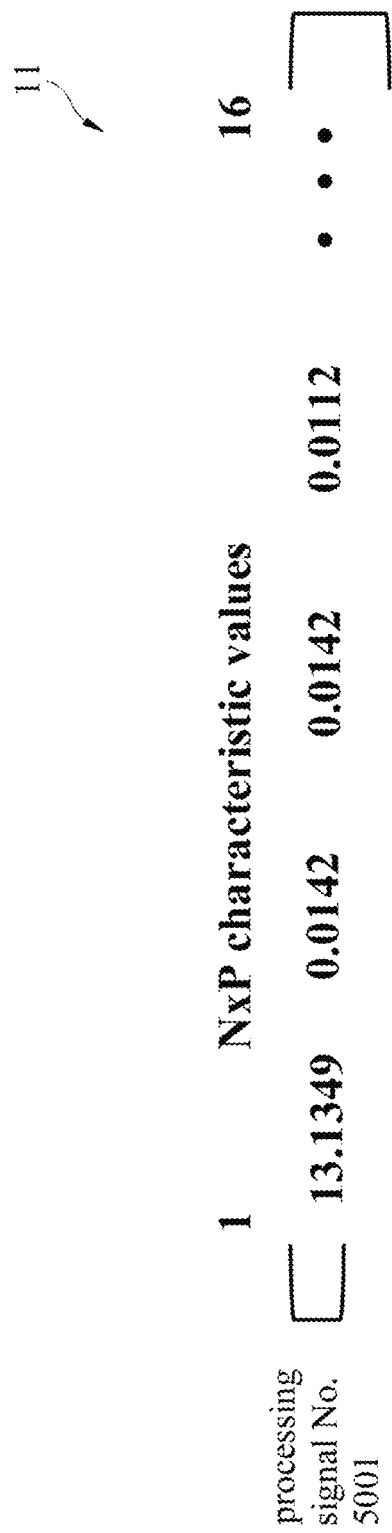
FIG. 5D is a schematic view of a matrix of wear state information in FIG. 4.

For example, in step S450, the processing signal of number M+Y (such as number 5001) is first acquired; next, in step S451, the processing signal is divided into N (such as four) second datasets according to different frequency bands by using a frequency band decomposition method such as wavelet packet decomposition, and the statistical parameters (that is, the attributes are the same four characteristics as wavelet coefficient, root mean square, kurtosis and margin) of N (such as four) second datasets are calculated; afterwards, in step S452, a 1*16 matrix is calculated according to all the wear characteristics of that processing operation (for example, the 5001st), as shown in FIG. 5D, which is used as wear state information.

Subsequently, in step S46, the mold state analysis operation is performed, so that the calculation unit 11 inputs the wear state information into the target model to calculate a loss function, which is used as the wear index of the mold.

Figure 5E:
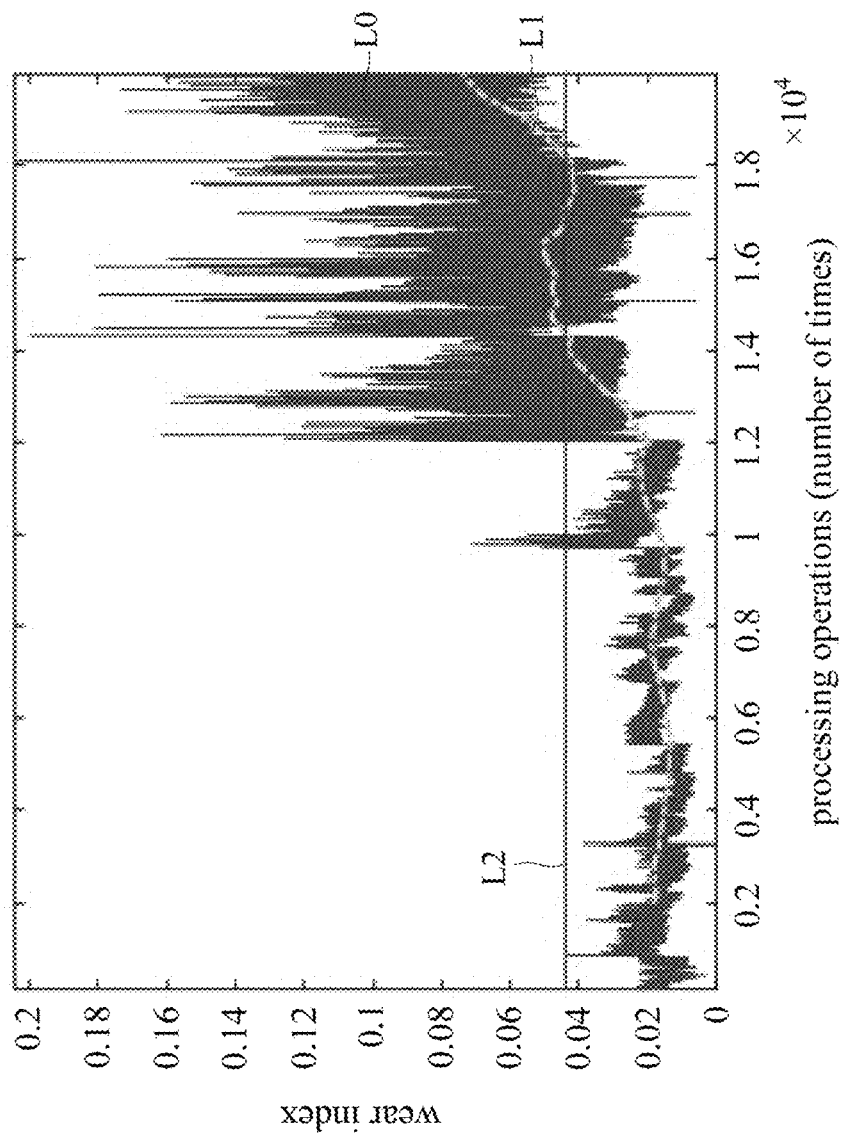
FIG. 5E is a schematic view of the curve of the target information obtained by the process of FIG. 4.

In this embodiment, as the processing operation continues, the wear index generated by each processing signal of the M+Y will be displayed on the monitoring page like a computer screen one by one, such as the initial curve L0 shown in FIG. 5E.

Next, in step S47, the prediction unit 12 starts to predict at a predetermined time point.

Figure 6A:
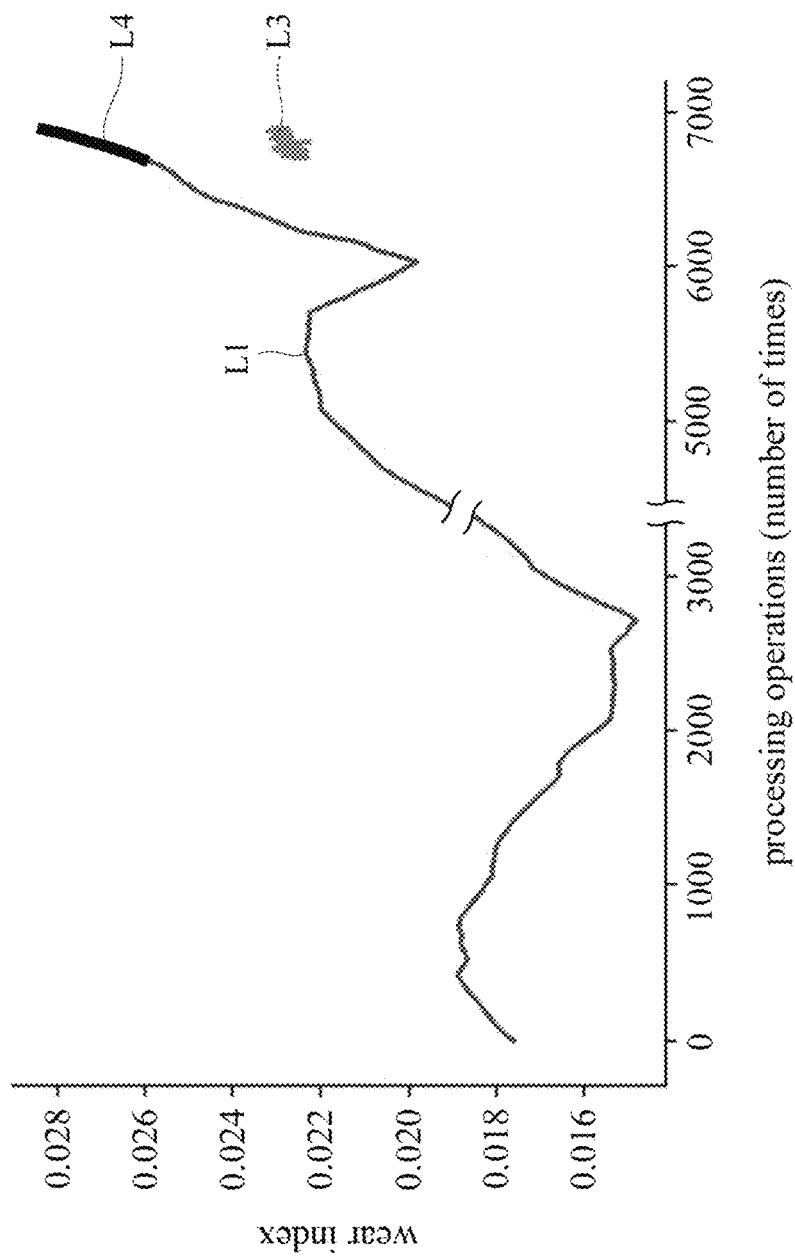
FIG. 6A to FIG. 6D are schematic views showing the process of a predicting operation according to the present disclosure.
Figure 6B:
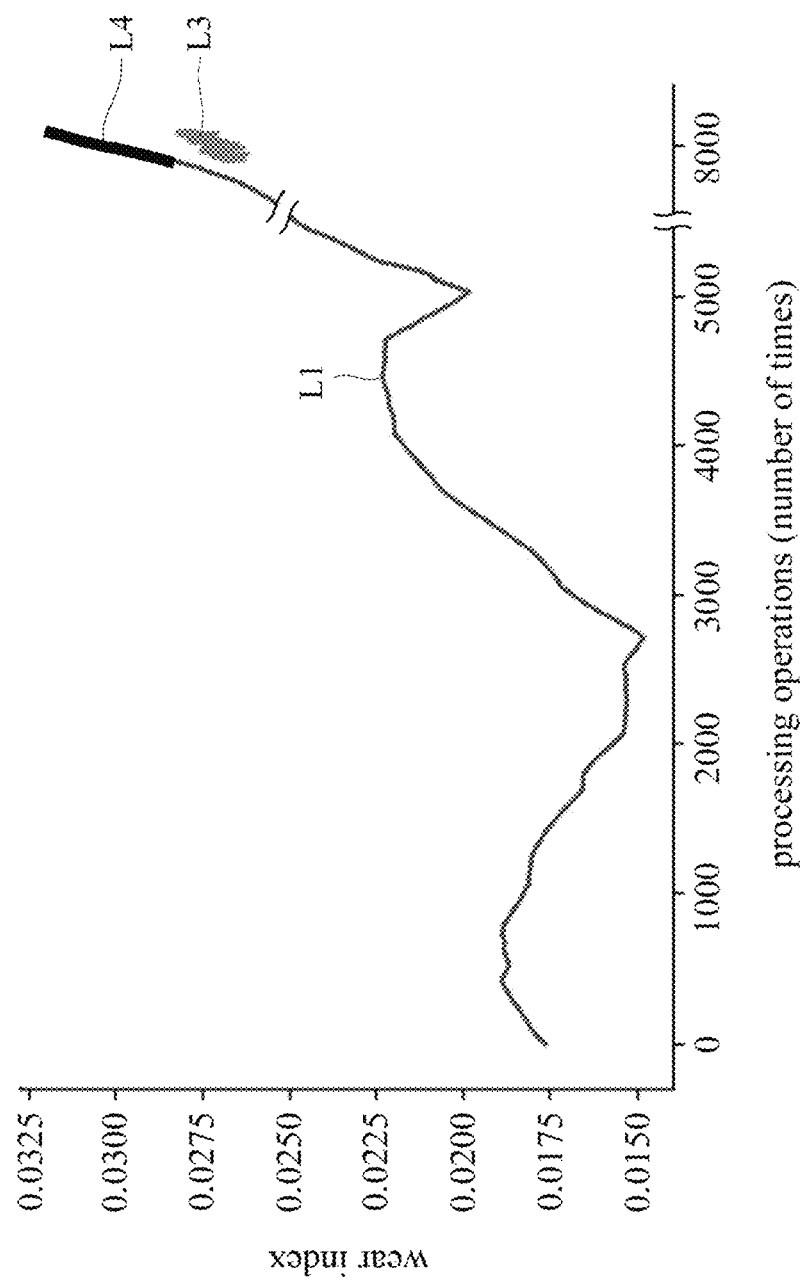
Figure 6C:
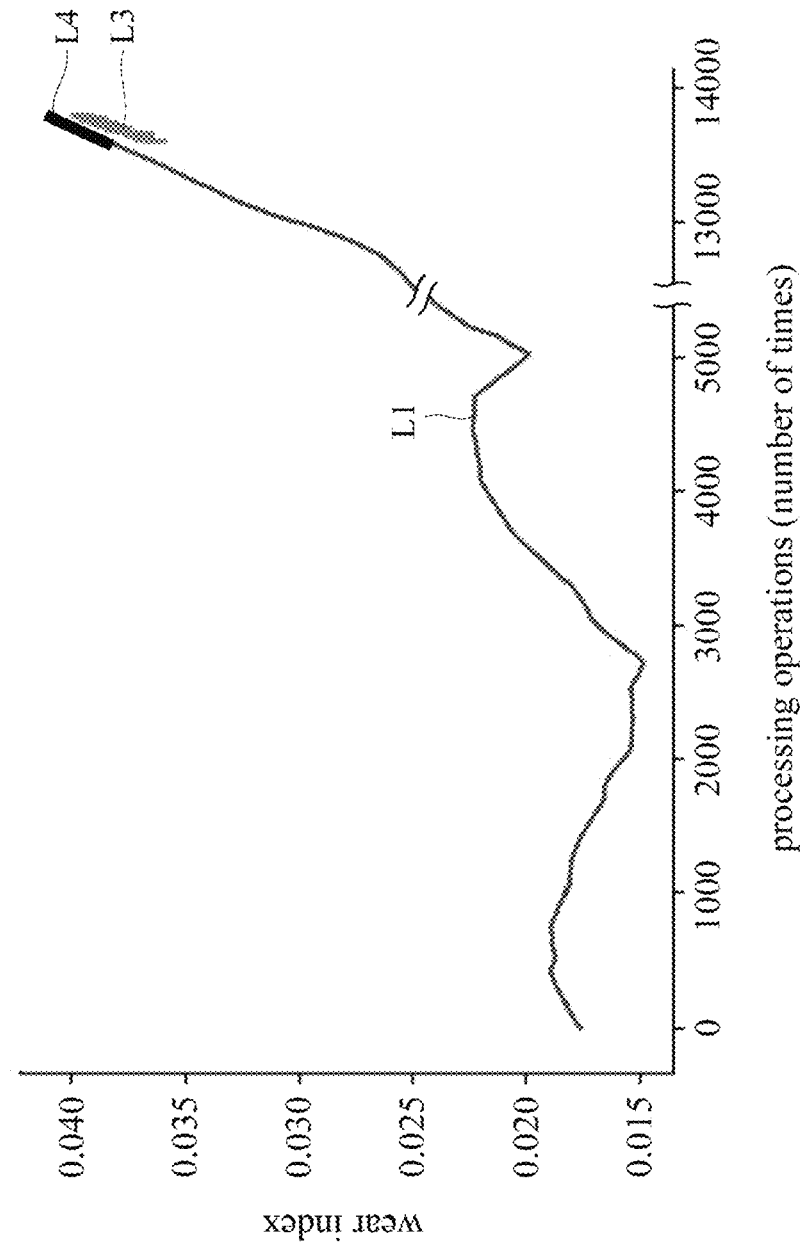

In this embodiment, the generation time point of No. 7000 processing signal is used as the predetermined time point, so the prediction unit 12 will start the prediction operation when No. 7000th processing signal is generated, so that the latest 2,000 (i.e. No. 5001 to No. 7000) processing signal records are inputted into LSTM for training to predict the predicted value generated by the next 200 (i.e. hypothetical No. 7001 to No. 7200) processing signal records (or the predicted trend curve L3 trend as shown in FIG. 6A). And every time 100 new processing signal records are added (such as No. 7100 is generated), the prediction unit 12 will retrain the LSTM and update the prediction, and repeat it (No. 7000 to No. 13800 as shown in FIG. 6A to FIG. 6D) to judge the damage time point B of the mold, that is, to estimate the timing of mold change, wherein the reference curve L4 shown in FIG. 6A to FIG. 6D is the actual situation to verify the accuracy of the predicted trend curve L3. Therefore, the dynamic prediction method of the prediction unit 12 can be as follows:

| Start time (adding 100 records) | LSTM training (inputting 2000 records) | Wear prediction value (predicting next 200 records) |
|---|---|---|
| No. 7000 processing signal | No. 5001 to No. 7000 | hypothetical No. 7001 to No. 7200 |
| No. 7100 processing signal | No. 5101 to No. 7100 | hypothetical No. 7101 to No. 7300 |
| No. 7200 processing signal | No. 5201 to No. 7200 | hypothetical No. 7201 to No. 7400 |
| No. 7300 processing signal | No. 5301 to No. 7300 | hypothetical No. 7301 to No. 7500 |
| . | . | . |
| . | . | . |
| . | . | . |
| No. 7000 + 100Y processing signal | No. 5001 + 100Y to No. 7000 + 100Y | hypothetical No. 7001 + 100Y to No. 7200 + 100Y |

Figure 6D:
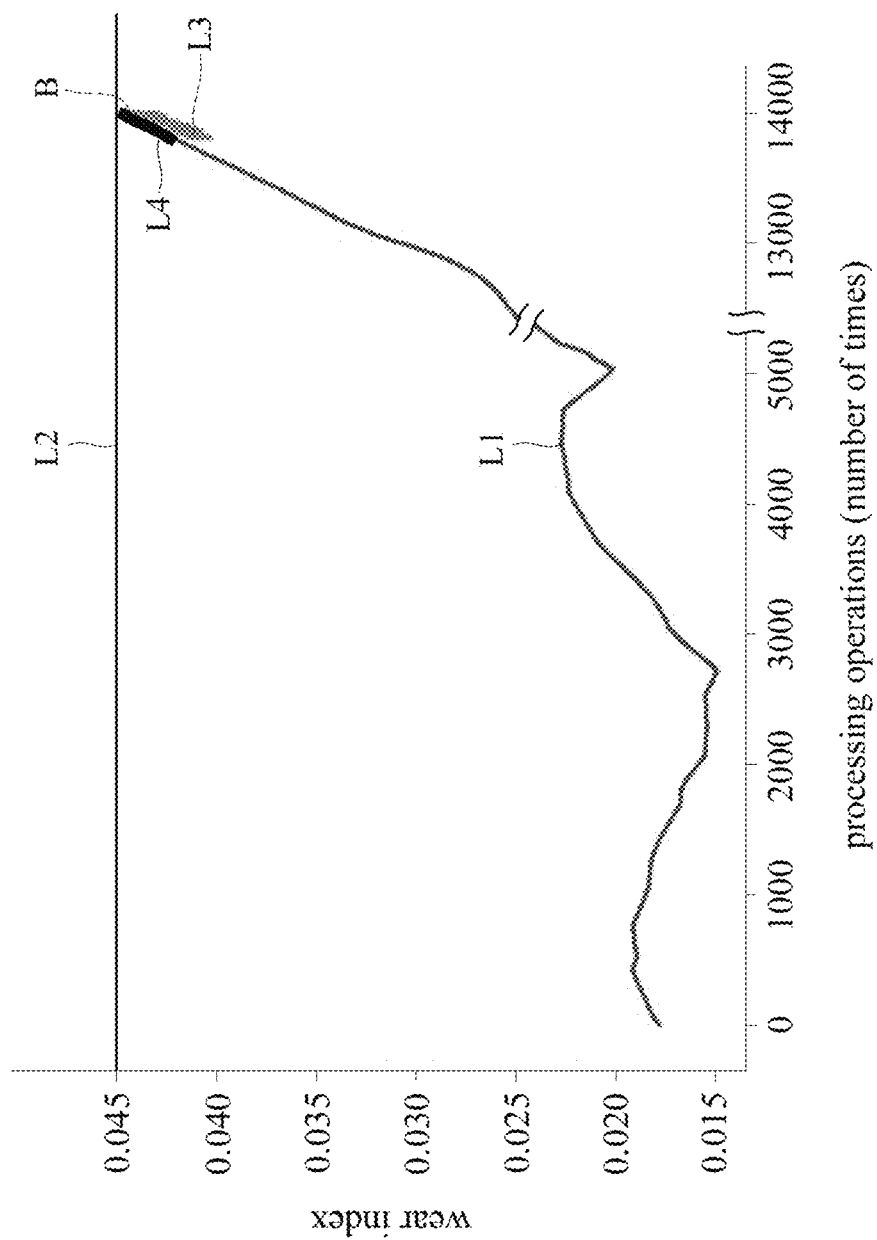

Afterwards, in step S48, when it is judged that the mold is about to be damaged in step S47, that is, the predicted value will be greater than the wear threshold (horizontal straight line L2 is 0.45) at the damage time point B (hypothetical No. 13,801 to No. 14,000 shown in FIG. 6D), indicating that the life of the mold is close to the limit. Therefore, the prediction unit 12 will issue a warning and start an early warning mechanism such as a light signal warning to remind the operator that the mold change operation is required to be performed when the processing times are from No. 13,801 to No. 14,000, wherein the reference curve L4 shown in FIG. 6D is also roughly damaged at No. 13,801 to No. 14,000.

To sum up, the mold state monitoring system 1 and its state monitoring method of the present disclosure, through the design of the LSTM, can change the target information on the production line at any time so as to evaluate the life state of the mold. Therefore, on the production line, the molds operated by the mold state monitoring system 1 can maintain effective processing operations to maintain processing quality.

The foregoing embodiments are used for the purpose of illustrating the principles and effects only rather than limiting the present disclosure. Anyone skilled in the art can modify and alter the above embodiments without departing from the spirit and scope of the present disclosure. Therefore, the range claimed by the present disclosure should be as described by the accompanying claims listed below.

What is claimed is:

1. A mold state monitoring method that is applied to a machine tool equipped with a controller and a mold, the mold state monitoring method comprising:
   providing a plurality of processing signals generated by a plurality processing times of the mold;
   performing a characteristics acquisition operation to divide the plurality of processing signals into initial state information and wear state information;
   using the initial state information to obtain a target model and a wear threshold;
   inputting the wear state information into the target model to obtain a wear index of the mold;
   inputting at least part of the plurality of processing signals and corresponding wear indices thereof into a time series prediction model for training to obtain wear prediction values of hypothetical times as target information, wherein the order of the hypothetical times is after the last of the plurality of processing times; and
   performing a predicting operation based on the target information to predict a damage time point of the mold, wherein when the wear prediction value is greater than the wear threshold, it means that the mold is abnormal, and the target information includes dynamic data that is continuously updated according to an increase in the processing times, so that the predicting operation predicts the damage time point of the mold at any time;
   wherein the characteristics acquisition operation is to decompose the original time domain signal into time domain signals of different frequency bands by using a frequency band decomposition method for the processing signals;
   wherein the plurality of processing signals are defined as first period processing signals and second period processing signals, so that after the first period processing signals are decomposed and analyzed by the frequency band decomposition method, characteristics related to the mold wear are identified and defined as first wear characteristics so as to be integrated into the initial state information, and the second period processing signals are decomposed by the frequency band decomposition method and second wear characteristics corresponding to the characteristics related to the mold wear are extracted to be integrated into the wear state information.

2. The mold state monitoring method of claim 1, comprising receiving and screening a plurality of processing initial signals to perform a signal judgment operation so as to obtain the plurality processing signals.

3. The mold state monitoring method of claim 1, wherein the processing signals are characteristic signals of mold wear.

4. The mold state monitoring method of claim 1, wherein an attribute of the second wear characteristics is the same as an attribute of the first wear characteristics.

5. The mold state monitoring method of claim 1, wherein the target model is a self-supervised learning model.

6. The mold state monitoring method of claim 1, wherein the target information includes dynamic data that is continuously updated according to an increase in the processing times.

7. The mold state monitoring method of claim 1, wherein the target information includes a graph formed by the wear index and the wear prediction value, so that the predicting operation predicts the damage time point of the mold by judging a trend of the wear prediction value in the graph.

8. A mold state monitoring system that is applied to a machine tool equipped with a controller and a mold, the mold state monitoring system comprising:
    an acquisition sensor which is used to provide a plurality of processing signals;
    a calculation module which is communicatively connected to the acquisition sensor to receive the plurality of processing signals and perform a characteristics acquisition operation, and divide the plurality of processing signals into initial state information and wear state information, so that the initial state information is used to train a target model and generate a wear threshold, and the wear state information is inputted into the target model to obtain a wear index of the mold; and
    a prediction module which is communicatively connected to the calculation module to receive the wear index, and performs a predicting operation based on the wear threshold to predict a damage time point of the mold, wherein the prediction module includes a time series prediction model so as to input at least part of the plurality of processing signals and corresponding wear indices thereof into the time series prediction model for training to obtain wear prediction values of hypothetical times as target information;
    wherein the order of the hypothetical times is after the last of the plurality of processing times;
    when the wear prediction value is greater than the wear threshold, it means that the mold is abnormal; and
    the target information includes dynamic data that is continuously updated according to an increase in the processing times, so that the predicting operation predicts the damage time point of the mold at any time;
    wherein the characteristics acquisition operation is to decompose the original time domain signal into time domain signals of different frequency bands by using a frequency band decomposition method for the processing signals;
    wherein the plurality of processing signals are defined as first period processing signals and second period processing signals, so that after the first period processing signals are decomposed and analyzed by the frequency band decomposition method, characteristics related to the mold wear are identified and defined as first wear characteristics so as to be integrated into the initial state information, and the second period processing signals are decomposed by the frequency band decomposition method and second wear characteristics corresponding to the characteristics related to the mold wear are extracted to be integrated into the wear state information.

9. The mold state monitoring system of claim 8, wherein the acquisition sensor receives and screens a plurality of processing initial signals to perform a signal judgment operation, so as to obtain the plurality processing signals.

10. The mold state monitoring system of claim 8, wherein the processing signals are characteristic signals of mold wear.

11. The mold state monitoring system of claim 8, wherein an attribute of the second wear characteristics is the same as an attribute of the first wear characteristics.

12. The mold state monitoring system of claim 8, wherein the target model is a self-supervised learning model.

13. The mold state monitoring system of claim 8, wherein the target information includes dynamic data that is continuously updated according to an increase in the processing times.

14. The mold state monitoring system of claim 8, wherein the target information includes a graph formed by the wear index and the wear prediction value, so that the predicting operation predicts the damage time point of the mold by judging a trend of the wear prediction value in the graph.

* * * * *